United States Patent
Wang et al.

(10) Patent No.: US 6,505,162 B1
(45) Date of Patent: Jan. 7, 2003

(54) APPARATUS AND METHOD FOR PORTABLE DIALOGUE MANAGEMENT USING A HIERARCHIAL TASK DESCRIPTION TABLE

(75) Inventors: Huei-Ming Wang, Taipei (TW); Yi-Chung Lin, Keelung (TW); Tung-Hui Chiang, Taichung (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 09/426,275

(22) Filed: Oct. 25, 1999

(30) Foreign Application Priority Data

Jun. 11, 1999 (TW) ...................................... 88109759 A

(51) Int. Cl.⁷ ............................................. G10L 15/22
(52) U.S. Cl. ...................................... 704/275; 704/270
(58) Field of Search .................................. 704/270, 275

(56) References Cited

U.S. PATENT DOCUMENTS

| | | | | |
|---|---|---|---|---|
| 5,357,596 A | * | 10/1994 | Takebayashi et al. | 704/275 |
| 5,694,558 A | | 12/1997 | Sparks et al. | |
| 5,999,904 A | * | 12/1999 | Brown et al. | 704/272 |
| 6,035,275 A | * | 3/2000 | Brode et al. | 704/275 |
| 6,044,347 A | * | 3/2000 | Abella et al. | 704/272 |
| 6,073,102 A | * | 6/2000 | Block | 704/275 |
| 6,115,711 A | * | 9/2000 | White | 707/10 |
| 6,173,266 B1 | * | 1/2001 | Marx et al. | 704/270 |
| 6,192,110 B1 | * | 2/2001 | Abella et al. | 379/88.01 |
| 6,246,981 B1 | * | 6/2001 | Papineni et al. | 704/235 |

OTHER PUBLICATIONS

Emiel Krahmer, Jan Landsbergen, Xavier Pouteau. How to obey the 7 commandments for spoken dialogue? ACL, 1997.
Rajeev Agarwal Towards a PURE Spoken Dialogue System For Information Access. ACL 1997.
Stephanie Seneff Dec. 1997 Disclosure and Dialogue Modelling in the GALAXY System.
David Goddeau, Helen Meng, . . . et al. A Form–Based Dialogue Manager for Spoken Language Applications. ICSLP '96.
Don Colton, Ron Cole, David G. Novick, Stephen Sutton A Laboratory Course for Resigning and Testing Spoken Dialogue Systems. ICASSP '96.
Esther Levin, Roberto Pieraccini Wieland Eckert Using Markov Decision Process for Learning Dialogue Strategies ICASSP '98.
Kenji Kita, Masaaki Nagata, Tsuyoshi Morimoto Automatic Aquisition Of Probabilistic Dialogue Models. ICSLP '96.
James Glass Giovanni Flammia, David Goodline, . . . etc. Multilingual spoken–language understanding in the MIT Voyager system. Speech Comm, 1995.
Mark–Jan Nederhof, Gosse Bouma, Rob Koeling, Gertjan van Noord. Grammatical analysis in the OVIS spoken–dialogue system. ACL, 1997.
Masahiro Araki, Taro Watanabe, Felix Merida Quimbo and Shuji Doshita A Cooperative Man–Machine Dialogue Model For Problem Solving. ICSLP '94.
J. Caminero–Gil J. Alvarez–Cercadillo, . . . et. al. Data–Driven Discourse Modeling For Semantic Interpretation. ICASSP '96.

\* cited by examiner

Primary Examiner—Tālivaldis Ivars Šmits

(57) ABSTRACT

A portable dialogue management system includes a dialogue manager and a hierarchical task description table. The hierarchical task description table has a plurality of base tables connected with a hierarchical structure. Each base table defines the strategy of a sub-dialogue and stores the dialogue states, a number of domain parameters, and a plurality of response actions corresponding to each dialogue state. The dialogue manager manages the dialogue state of a dialogue system, determines the dialogue state and executes the appropriate response action. Because the domain knowledge is defined in the hierarchical task description table and the dialogue manager is not dependent on the application domain, the dialogue management system is easily portable to different applications. A stack may also be used to push in or pop up a dialogue state so that dialogues of multiple purposes can be accomplished.

18 Claims, 18 Drawing Sheets

|  | train ID | number of the reserved tickets | date of reserved tickets | |
|---|---|---|---|---|
| P1 | S1 | − | × | × | to time table query base table |
| G | S2 | × | − | × | asking for the number of reserved tickets |
| G | S3 | × | × | − | asking for the date of reserved tickets |
| S4 | + | + | + | ordering ticket ; return |
| P2 | S5 | × | >4 | × | message: too many reserved tickets |

→ time table query base table

FIG. 5

| State | Current Goal | Response Action |
|---|---|---|
| S1 | ticket order | To ticket order base table; Reset the goal; Return |
| S2 | time query | To time table query base table; Reset the goal; Return |
| S3 | fare query | To fare query base table; Reset the goal; Return |
| S4 | - | Greeting |

FIG. 11(a)

| Attribute | State | Train Type | Departure Station | Arrival Station | Query Result | Response Action |
|---|---|---|---|---|---|---|
| G | S1 | - | x | x | - | Asking the user for the train type |
| G | S2 | x | - | x | - | Asking the user for the departure station |
| G | S3 | x | x | - | - | Asking the user for the arrival station |
|   | S4 | + | + | + | - | Querying the database for ticket fare in fare table |
|   | S5 | x | x | x | = 0 | Message: not found; Return |
|   | S6 | x | x | x | > 0 | Message: fare; Return |

FIG. 11(b)

| Attribute | State | Train ID | Number of Reserved Tickets | Reserved Day | Response Action |
|---|---|---|---|---|---|
| P1 | S1 | - | x | x | To time table query base table; Check the return value from time table query base table; Return |
| G | S2 | x | - | x | Asking the user for the number of reserved tickets |
| G | S3 | x | x | - | Asking the user for the date of reserved tickets |
|  | S4 | + | + | + | Ordering ticket; Return |
| P2 | S5 | x | > 4 | x | Message: too many reserved tickets |

FIG. 11(c)

| Attribute | State | Input Train # | Train Type | Departure Station | Departure Time | Arrival Station | Arrival Time | Query Result | Response Action |
|---|---|---|---|---|---|---|---|---|---|
| G | S1 | - | - | x | x | x | x | - | Asking the user for the train type |
| G | S2 | x | x | - | x | x | x | - | Asking the user for the departure station |
| G | S3 | x | x | x | x | - | x | - | Asking the user for the arrival station |
| G | S4 | x | x | x | - | x | - | - | Asking the user for the departure time |
|  | S5 | - | + | + | + | + | x | - | Querying the database for the time table |
|  | S6 | - | + | + | x | + | + | - | Querying the database for the time table |
|  | S7 | + | x | + | x | + | x | - | Querying the database for the time table |
| P | S8 | x | x | x | x | x | x | + | To confirmation base table; Check the return value from confirmation base table; Returning to the previous base table and continuing matching |

FIG. 11(d)

| State | Time Table Query Result (# of records) | # of Suggested Records | User Confirmation | User Choice | Response Action |
|---|---|---|---|---|---|
| S1 | = 0 | = 0 | x | - | Message: no specified train found; Clearing the fields of system states including train ID, train type, departure station and arrival station; Returning to the previous base table and continue matching |
| S2 | = 1 | x | x | - | Filling in the system states with train ID, train type, departure time and arrival time; Return |
| S3 | > 1 | x | x | - | Listing all available trains; Return |
| S4 | = 0 | > 0 | - | - | No specified train found; Prompting alternatives |
| S5 | = 0 | > 0 | = Yes | - | Filling in system states with train ID, train type, departure time and arrival time; Return |
| S6 | = 0 | = 1 | = No | - | Message: Requery; Clearing the system states including train type, departure station and arrival station; Returning to the previous base table and continuing matching |
| S7 | = 0 | > 1 | = No | - | Message: re-choosing |
| S8 | = 0 | > 0 | x | + | Filling in the system states with train ID, train type, departure time and arrival time; Return |

FIG. 11(e)

APPARATUS AND METHOD FOR PORTABLE DIALOGUE MANAGEMENT USING A HIERARCHIAL TASK DESCRIPTION TABLE

FIELD OF THE INVENTION

The present invention relates generally to spoken dialogue systems, and more particularly to a method and apparatus for portable dialogue management in a spoken dialogue system.

BACKGROUND OF THE INVENTION

Rapid progress in computer technology makes it possible for a human user to communicate with a computer using spoken dialogue. The function of a spoken dialogue system is to provide a method that allows a human user to communicate with a computer by means of natural language words. A spoken dialogue system can be used in many different applications such as conversational systems for weather inquiring, railroad information access or city guide, . . . , etc.

FIG. 1 illustrates the general architecture of a typical spoken dialogue system. The typical spoken dialogue system includes five modules, i.e., speech recognition module 101, language understanding module 102, dialogue management module 103, language generation module 104, and speech synthesis module 105.

The spoken dialogue system first converts the speech input into sentences using speech recognition module 101. Secondly, the language understanding module 102 makes use of a vocabulary set, grammar rules and semantic knowledge on the language to represent the semantic meaning of the sentences. Based on the semantic representation, the dialogue management module 103 takes appropriate actions and passes a response semantic frame to the language generation module 104. The language generation module 104 generates appropriate sentences in the target language from the semantic frame. According to the generated sentences from the language generation module 104, the speech synthesis module 105 finally synthesizes speech and provides appropriate responses to the user.

The dialogue management module is the kernel for controlling the dialogue flow between a user and a spoken dialogue system. In different applications, the system may be engaged in different dialogues between a user and the system. Therefore, a dialogue management module is the module that has to deal with many domain-dependent characteristics in a spoken dialogue system. In developing a spoken dialogue system, it is very important to have a portable dialogue manager that can be easily ported to a different domain.

There have been several approaches to designing a dialogue manager embodied in dialogue systems. For example, Glass et al. presented "Multilingual Spoken-language Understanding in the MIT Voyager System" in Speech Communication, Vol. 17, No. 1–18, 1995. A spoken dialogue system can be quickly constructed using Glass's approach. However, in the design it is necessary to modify the dialogue manager when the interaction over the dialogue is changed. In other words, the dialogue manager is not portable.

An alternative approach is to develop a dialogue manager based on a finite state network model. The following are some of the arts on the subject:

Kita K. et al., "Automatic Acquisition of Probabilistic Dialogue Models", Proceedings of ICSLP'96, pp. 196–199, Philadelphia, USA, 1996.

Levin et al., "Using Markov Decision Process for Learning Dialogue Strategies", Proceedings of ICASSP'98, pp. 201–203, Seattle, USA, 1998.

Colton et al. "A Laboratory Course for Designing and Testing Spoken Dialogue Systems", Proceedings of ICASSP'96, pp. 1129–1132, Atlanta, Calif., 1996.

In the above arts, a dialogue management technology is used to collect all possible dialogues and messages from other system resources through the whole interactions with the user. Then, a network having plurality of nodes is formed based on the dialogues and messages. The network connection is constructed according to the relationship among the nodes. The complete control over the dialogue is then handled directly by the network.

Such a dialogue manager is portable. However, the dialogue manager can only manage dialogue that is highly structured so that it can define all possible states over the dialogue and the connections among the states. In addition, the complete control over the dialogue is directed along the path defined in the network. Therefore, the dialogue manager is more suited in a system in which the dialogue flow is system-initiated.

Another approach is to develop a dialogue manager based on a form-based model. For example, Goddeau et al. disclosed a method that designs a form for needed information in "A Formed-Based Dialogue Manager for Spoken Language Applications", Proceedings of ICSLP'96, pp. 701–704, Philadelphia, USA, 1996. The user input is used to fill in corresponding fields of the form. Once a field in the form is filled in, the system responds with a corresponding action. For example, requesting the user for more information to fill in other fields. The user may fill in the form with the information according to the system's prompt or by any order. This type of mixed-initiative dialogue is limited to a goal-specific spoken dialogue system, such as accessing some information from a large database for a user's interest.

An alternative approach is to develop a dialogue manager based on a tree-structured model. The following are some of the arts on the subject:

U.S. Pat. No. 5,694,558 granted to Sparks et al. entitled "Method and System for Interactive Object-Oriented Dialogue Management".

Camineo-Gil et al., "Data-Driven Discourse Modeling for Semantic Interpretation", Proceedings of ICASSP'96, pp. 401–404, Atlanta, Calif. 1996.

Masahiro et al., "A Cooperative Man-Machine Dialogue Model for Problem Solving", Proceedings of ICSLP'94, pp. 883–886, Yokohama, JP, 1994.

In the above art, the dialogue management technology is based on a task-oriented dialogue model. In the approach, the system task includes a set of subtasks. Below each subtask is a set of smaller tasks. The dialogue plan is implemented as a tree structure. Controlling over the dialogue is like searching nodes of the tree, and can not be switched among the subtasks at the same level. Therefore, the dialogue plan tends to be inflexible.

Another approach is to develop a dialogue manager based on a table-driven model. For example, Stephanie Seneff discloses a method that provides a set of variables representing dialogue states in "Discourse and Dialogue Modeling in the GALAXY Systems", Seminar of Spoken Dialogue System and Discourse Analysis, pp. 12–24, Taipei, Taiwan, ROC, 1997. The expressions performed on the variables trigger the system actions based on default rules such as Boolean operations, arithmetic operations or string comparisons. A table consisting of the well-defined variables, rules and system actions represents the complete flow over the dialogue. The values of the variables may vary during the dialogue execution. This will cause different rules to trigger the corresponding actions. Therefore, it is a dialogue system of a mixed-initiative type.

In the method, the complete flow over the dialogue system is described in a table. It can not provide a structural description for the dialogue system. When the dialogue system tries to achieve multiple subjects, all the variables on the subjects should be specified in the same table. In practice, it may happen that the variables used by some subjects be not used by other subjects. In such a situation, the degree of complexity becomes too much for one single table, and it is thus hard to maintain the table.

A similar approach to the table-driven model to make the dialogue manager portable is based on a task description table (TDT) 106 as shown in FIG. 1.

Other approach is to develop a dialogue manager based on a dialogue-state or a stack model. For example, Mark-Jan Nederhof et al. presented "Grammatical Analysis in the OVIS Spoken Dialogue System" based on dialogue states in Proceedings Workshop sponsored by the Association for Computational Linguistics, pp. 66–73, Madrid, Spain, 1997. Emiel Krahmer et al. presented "How to Obey the 7 Commands for Spoken Dialogue?" based on stacks in Proceedings Workshop Sponsored by the Association for Computational Linguistics, pp. 82–89, Madrid, Spain, 1997. Dialogue states or stacks are used to record the whole dialogue flow for providing the needed information of the control flow over the dialogue.

In addition, Rajeev Agarwal discloses a technology that divides a dialogue manager into two layers in "Towards a PURE Spoken Dialogue System for Information Access", Proceedings Workshop sponsored by the Association for Computational Linguistics, pp. 90–97, Madrid, Spain, 1997. In order to be ported to different domains for a spoken dialogue system, one layer is used to process domain-dependent dialogue states and the other layer is used to process domain-independent dialogue states.

SUMMARY OF THE INVENTION

The present invention has been made to overcome the above mentioned drawbacks of a conventional dialogue manager. The primary object of the invention is to provide a domain transparent dialogue manager that has a standard control mechanism. Accordingly, the portable dialogue management system of the invention comprises a dialogue manager and a hierarchical task description table (HTDT). The dialogue manager manages dialogue states of a dialogue system, selects appropriate dialogue states, and executes the response actions according to the selected dialogue states. The hierarchical task description table stores the dialogue states and defines dialogue strategy of the dialogue system.

According to the invention, the domain-dependent factors related to application domains are extracted out of the dialogue manager to form an external knowledge base, so that the control mechanism can be standardized. The dialogue manager controls the dialogue flow according to semantic input of a user and the instructions provided by the external knowledge base to generate semantic output in response. When the application domain changes, the external knowledge base is replaced instead of changing the dialogue manager. This solves he portability problem and lowers the cost of porting to a different domain.

Another object of the invention is to provide a hierarchical task description table that allows the external knowledge base to be easily designed and maintained. The HTDT can describe multi-goal dialogue flow and mixed-initiative type of dialogue embodied in a dialogue system. This designed dialogue flow is more modularized, sharable and easier to maintain and update the dialogue flow. Furthermore, because the external knowledge base has the characteristic that allows the system developer to predict the dialogue flow, it gives the system development a great deal of flexibility.

In one embodiment of the dialogue manager of this invention, a public transportation service system serves as a multi-goal dialogue system. It provides the ticket order services for the aircraft, the railroad and the bus. Each service is an independent subtask. A subtask is divided into three smaller tasks. They are ticket order, time table query and fare query.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 5 shows the format of the base table for the ticket order subtask in the embodiment of the present invention illustrated in FIG. 3.

FIG. 11(*a*) shows the complete flow for the train service system base table T1.

FIG. 11(*b*) shows the complete flow for the fare query base table T2.

FIG. 11(*c*) shows the complete flow for the ticket order base table T3.

FIG. 11(*d*) shows the complete flow for the time table query base table T4.

FIG. 11(*e*) shows the complete flow for the confirmation base table T5.

DETAILED DESCRIPTION OF THE PREFERRED EMBODIMENTS

Figure 1:
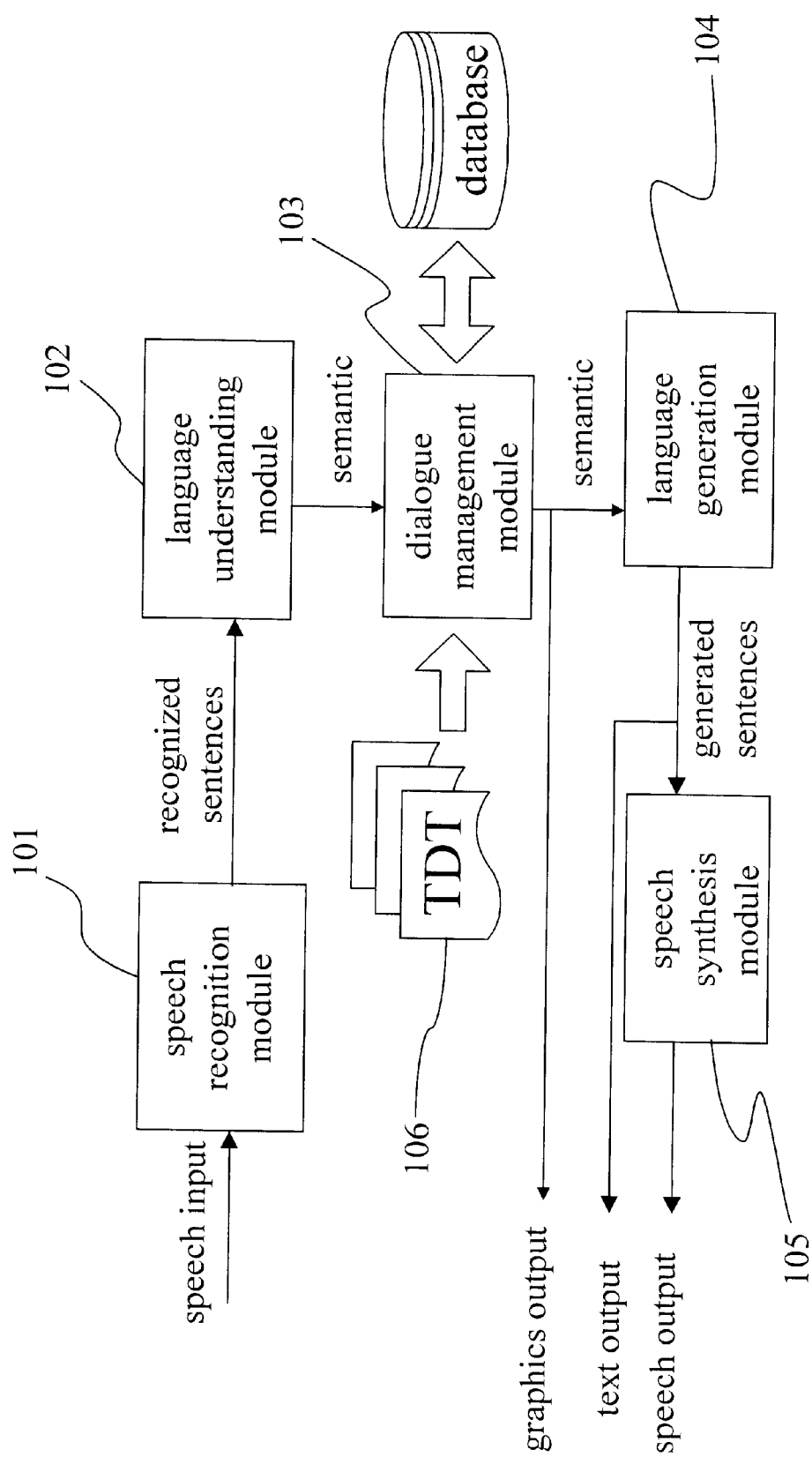
FIG. 1 shows the architecture of a typical spoken dialogue system.
Figure 2:
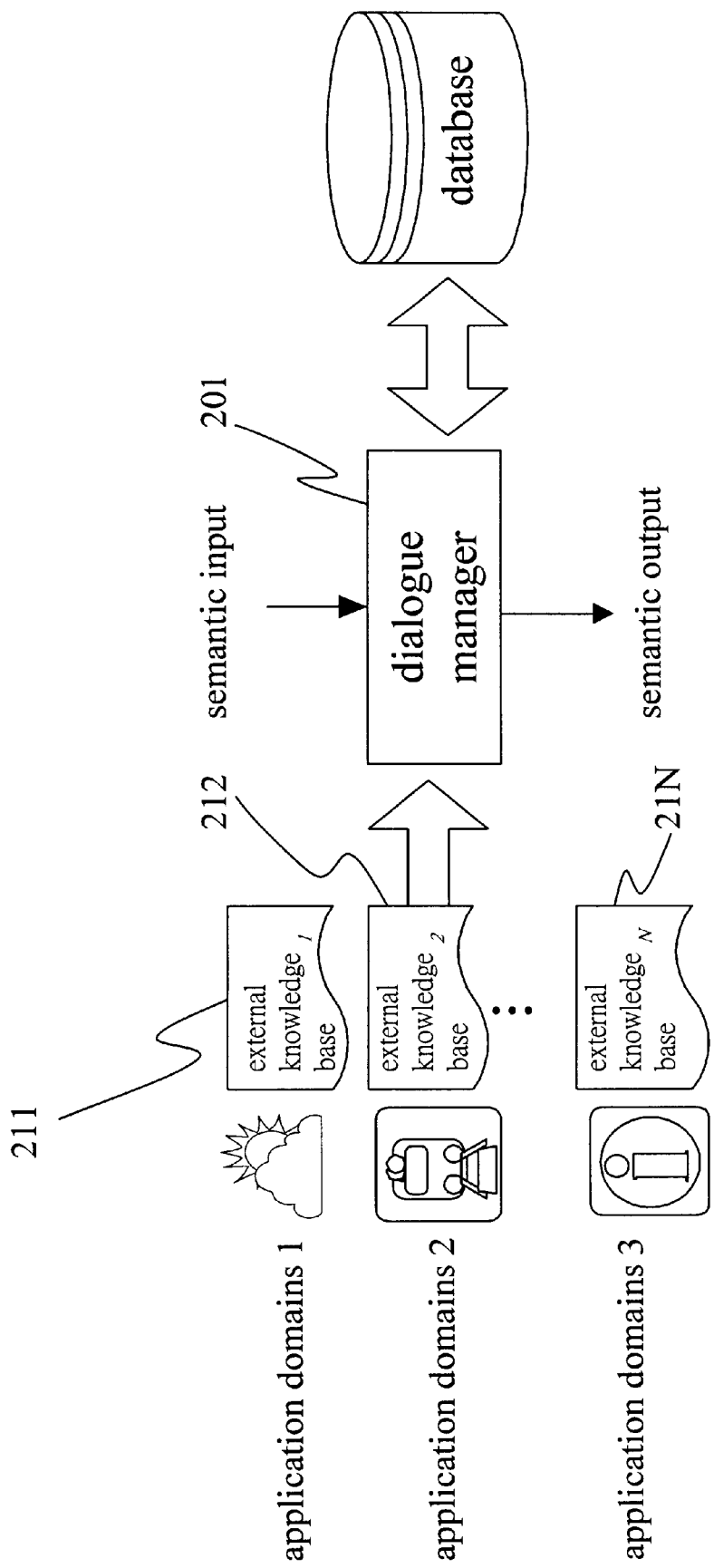
FIG. 2 shows the block diagram of the domain transparent dialogue manager of the present invention.

FIG. 2 shows the block diagram of the domain transparent dialogue manager of the present invention. In order to achieve the portability for different application domains, the domain-dependent factors are separated from the dialogue manager 201 to form external knowledge bases according to the invention. This de-couples the close relations between the dialogue manager and the application domains. The external knowledge bases 211~21N serve as the bridges between the dialogue manager and the application domains. According to the invention, it only requires to change the external knowledge base when the application domain is changed. As can be seen from FIG. 2, the dialogue manager 201 accepts semantic input and generates semantic output according to the external knowledge bases. The semantic input is the semantic representation of user's input dialogue and the semantic output is the semantic representation of output dialogue in response.

When a new application domain is being developed, the external knowledge base should describe all possible states over the dialogue. In order to implement the dialogue design by a form-filling approach, and to solve the problem that a single table can not easily describe a multi-goal dialogue strategy, this invention provides a hierarchical task description table that links all the task description tables of all the sub-dialogue strategies. This constructs a complete dialogue strategy.

The hierarchical task description table of the invention comprises a plurality of base tables. Each base table describes the sub-dialogue strategy for a specific goal. The structure within each base table of the hierarchical task description table reflects the relation of "parent" and "child" of each sub-dialogue strategy. A complete multi-goal dialogue strategy is accomplished by defining the sub-dialogue strategy and the relations among the sub-dialogues. Furthermore, the base tables used for defining the sub-dialogue strategy are sharable by the different application domains for the dialogue system. This shortens the development time and the testing time.

The following illustrates a public transportation service system as an example of a multi-goal dialogue system. A preferred embodiment of the dialogue manager of the present invention will be also described in detail.

Figure 3:
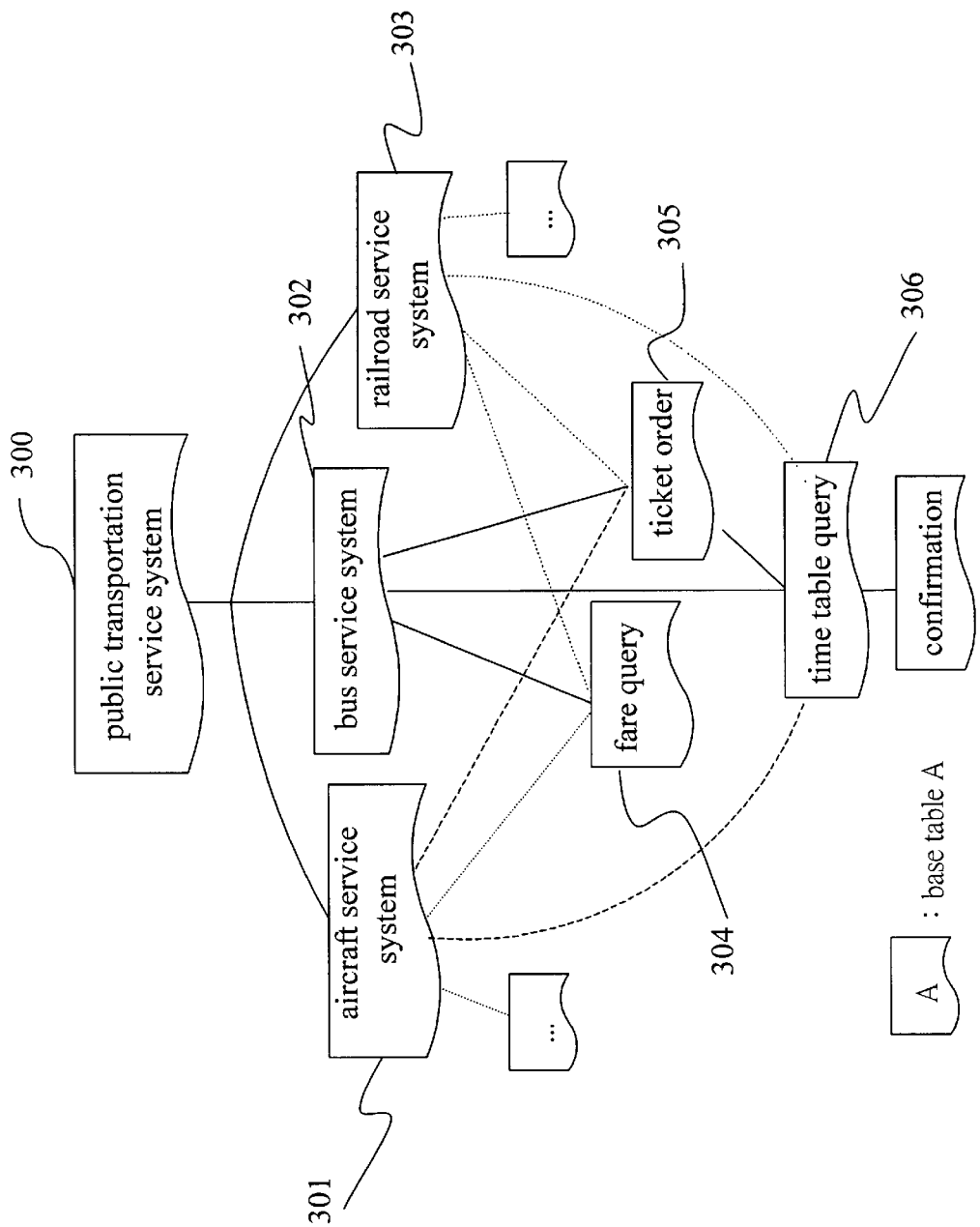
FIG. 3 shows the hierarchical task description table of a public transportation service system according to an embodiment of the present invention.

First, FIG. 3 illustrates the hierarchical task description table of the public transportation service system. As shown in FIG. 3, the public transportation service system 300 provides three service systems. They are aircraft service system 301, bus service system 302 and railroad service system 303. Each service system is an independent subtask. Below each independent subtask includes three smaller subtasks, fare query 304, ticket order 305 and time table query 306. Three base tables corresponding to three subtasks 304, 305 and 306 respectively are sharable by the aircraft service system 301, bus service system 302 and railroad service system 303.

Figure 4:
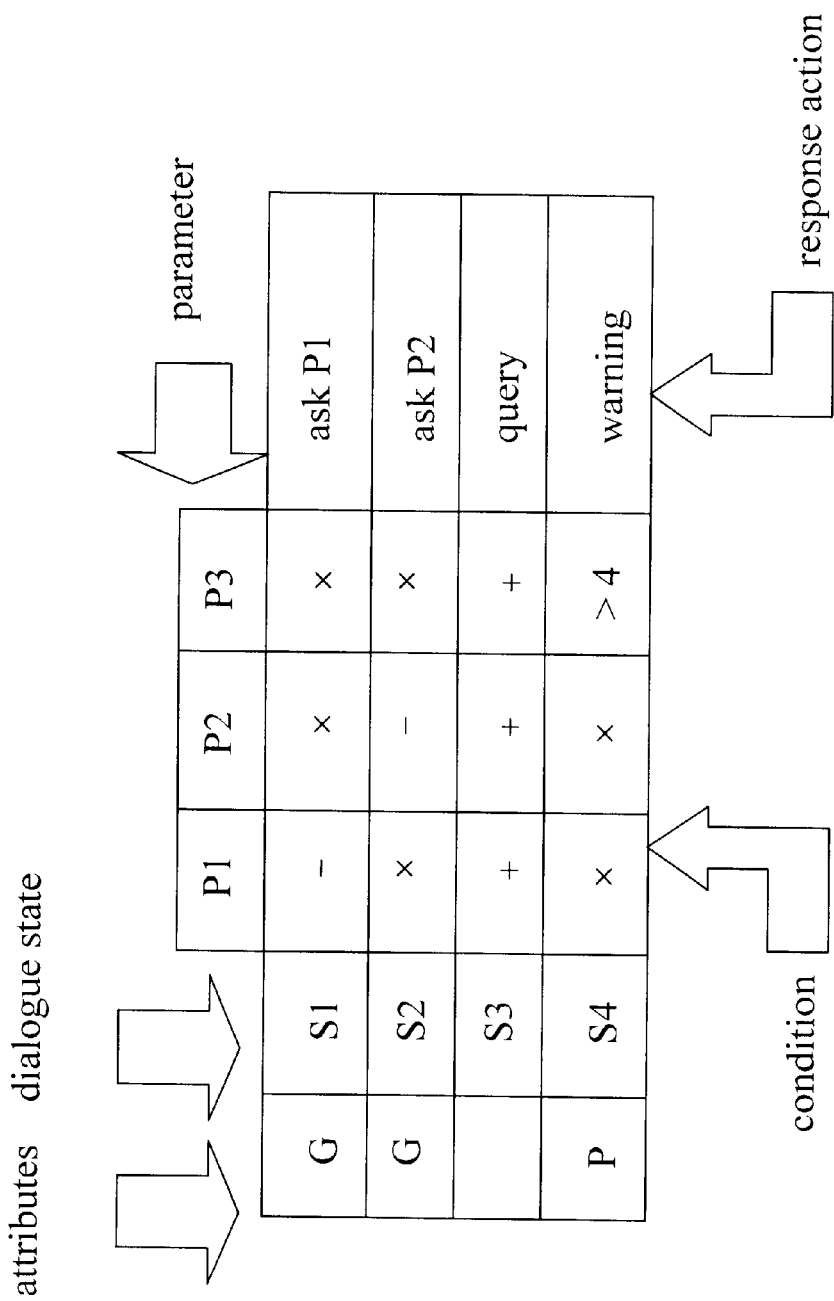
FIG. 4 shows the format in a base table for the hierarchical task description table of the present invention.

A base table is used to describe the flow for a sub-dialogue strategy. The format of a base table is illustrated in FIG. 4. A base table comprises two parts. One is referred to as parameter part. The other is referred to as dialogue state part. Each parameter represents a domain-dependent factor. The invention specifies a dialogue state by describing it in term of a parameter's condition. A different parameter's condition describes a different dialogue state. Then, response actions can be taken according to the certain dialogue states.

Referring to FIG. 4, the condition of a parameter may be three possible cases: having values (denoted by "+"), empty value (denoted by "−") and don't care (denoted by "×"). In the case of having values, it further includes three cases, i.e. greater than (denoted by ">"), less than (denoted by "<") and equal to (denoted by "=") some value. When the condition of a parameter is neither having values nor empty value, then it is the case of don't care. A dialogue state may also include attributes, such as priority (denoted by "P") or group (denoted by "G"). A response action may include the following items:

Providing a question or confirmation to the user.
Submitting a request to the system resources.
Other commands controlling the dialogue flow.

FIG. 5 illustrates the format of a base table for the ticket order subtask shown in FIG. 3. The base table of FIG. 5 defines three parameters including identifier for a transporter, number of the reserved tickets and the date of reserved tickets, and five states S1~S5. If the transporter identifier is not determined yet, it needs to query the time table query base table 306 for a certain transporter identifier. This is referred to as state S1. The base table 306 serves as the time table query subtask. If the number or the date of reserved tickets is not determined yet, it needs to ask the user for the number and the date, and they are referred to as states S2 and S3 respectively. After the transporter identifier, the number and the date of the reserved tickets have been confirmed, the system starts taking the action of ticket ordering. This is referred to as state S4. If a user asks for more than 4 tickets, the system should prompt a message. The message reminds the user that no more than 4 tickets may be ordered and asks the user for the number of tickets again. This is referred to as state S5.

By recording the domain-dependent dialogue states and the response actions in the external knowledge base, the tasks of the dialogue manager of the invention can be simplified. It needs only to match the current system state with the dialogue states within the hierarchical task description table, and selects the appropriate actions to execute. Therefore, it only needs to replace the external knowledge base instead of changing the dialogue manager when the application domain is changed.

Figure 6:
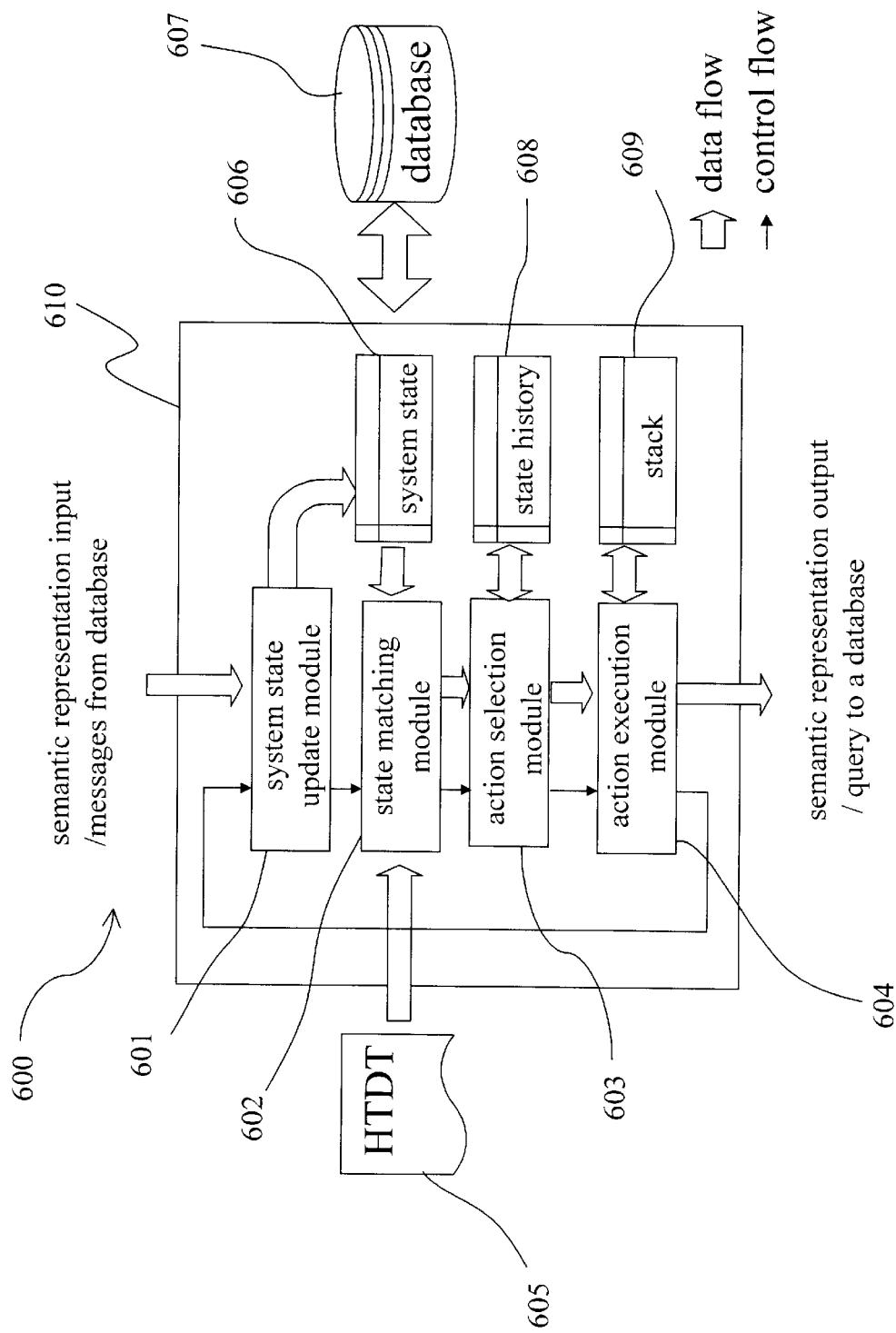
FIG. 6 shows the block diagram of the dialogue manager of the present invention.

The following illustrates the architecture for the dialogue manager of the invention and the flow performed by the preferred embodiment of the invention. FIG. 6 shows the block diagram of the dialogue manager 600 of the present invention.

With reference to FIG. 6, the kernel of the dialogue manager 600 comprises a system state update module 601, a state matching module 602, an action selection module 603, and an action execution module 604. The kernel of the dialogue manager 600 serves as a dialogue control unit 610 that matches the system states with the dialogue states within the hierarchical task description table 605, selects appropriate dialogue states based on the matching result, and performs the actions according to the selected dialogue states.

Because the dialogue states are not mutually exclusive, one-to-many relation may stand between the system state and the dialogue states within the hierarchical task description table when the matching is made. Therefore, this invention selects appropriate dialogue states by the effective attributes such as priority or group.

In addition, because the hierarchical task description table 605 can plan a multi-goal dialogue flow, the dialogue manager should allow the user to concurrently proceed with the dialogue of each application goal, and complete each application goal. The dialogue manager 600 of the invention uses the goal fields in the system state and the stack 609 to accomplish such objectives so that the executed information of the previous application goal can be maintained in the stack when the values in the goal fields are changed. The system can thus keep track of previous information and go on the previous dialogue after having completed another application goal.

The following illustrates each execution module of the dialogue manager 600 of the invention and the flow performed by the preferred embodiment of the invention.

(a) System State Update Module 601

The fields of the system state 606 comprise all parameters in the hierarchical task description table 605. The data for the parameters are provided by semantic representation input or other system messages such as query results from database 607. For example, if a user wants to go to Hsinchu and leaves from Taipei at 10:00 am. He also tries to order a Tzu-Chiang train ticket. Then, the system states updated with such a requirement are as follows:

Goal: order ticket

Train Type: Tzu-Chiang

Departure Station: Taipei

Departure Time: 10:00 am

Arrival Station: Hsinchu

The content of the system state 606 may be changed under the three cases, i.e. having user input, having return message from other system resource in response to the request of the dialogue manager, and having an action executed by the module 604 that updates the system state 606.

(b) State Matching Module 602

The task of the state matching is to find out the dialogue states in the hierarchical task description table 605 that match or belong to the current system state. In the previous example, if a user wants to go to Hsinchu and leaves from Taipei at 10:00 am. He also tries to order a Tzu-Chiang train ticket. Then, the matched dialogue states are S1, S2 and S3 that are compared with the current system state and obtained from an order ticket base table (shown in FIG. 5). The hierarchical task description table 605 has many base tables. However, the state matching proceeds with only one base table for one matching. The state matching module 602 further matches with another base table according to the response action just performed. For example, the response action for the order ticket base table S1 is "to time table query base table". If the action of S1 is performed, the state matching module 602 will match the dialogue states in "time table query base table".

The dialogue states that match the current system state will be sent to the action selection module. The appropriate response actions for the matched states are further determined according to the attribute of priority or group of the matched states.

(c) Action Selection Module 603

As stated in the above, it may obtain more than one dialogue states that match the current system state in the state matching module, such as the states S1~S3 of the ticket order base table in the previous example. In the invention, the action selection module 603 selects a dialogue state from the matched states according to the attribute of priority or group of the matched states. If more than one matched state have the same priority, the action selection module 603 selects a dialogue state or a group of dialogue states by a random number generating method.

According to the present invention, there are two types of priority. One is referred to as explicit priority. The other is referred to as implicit priority. The explicit priority is defined in the base table. The dialogue manager 600 determines the implicit priority.

The dialogue manager 600 executes the response actions of a matched dialogue state that has the highest explicit priority among all the matched dialogue states. In the previous example, because the state S1 has the highest explicit priority (P1) among the matched dialogue states S1~S3, the state S1 is chosen as the input for the action execution module 604.

If the current matched state is a dialogue state of the previous executed action, it indicates that the previous dialogue session has not been completed yet. Such a dialogue state has an implicit priority and should be executed first. For example, the dialogue states S2 and S3 are assumed to be the current matched states in a certain system state, i.e. the system asks the user for the number and the date of the reserved tickets. If the user provides another set of information that does not comply with the system prompt, the state matching module 602 still obtains the current matched states S1, S2 and other dialogue states. In such a case, states S1 and S2 have an implicit priority. In other words, the action selection module 603 has to keep the consistency of the system prompt to the user. The dialogue states executed in the previous state 606 are stored in the state history 608 for the reference of selecting a response action.

Group is also defined in a base table. The matched dialogue states that belong to the same group should be executed simultaneously. For example, in the ticket order base table, it may ask the user for the number and the date of the reserved tickets in one system prompt. In addition, it may define the explicit priority for a group.

(d) Action Execution Module 604

A response action is executed according to the output of the action selection module. There are four types for a response action:

A response to the user, which is described in semantic representation;

Submitting a request to the system resources, such as a query to a database;

Changing the content of the system state; and

Entering another base table and continuing matching.

When a response action is entering another base table and continuing to match with the base table, or changing the content of the goal field of the system states, then the current base table, the dialogue states and other useful information including goal will be pushed onto the stack 609. If an action of returning to the previous base table is encountered, then the information pushed before will be popped up. After having taken the information out of the stack, the system returns to the previous base table and the dialogue states according to the information. It is illustrated by the following example.

If the action, "to time table query base table", of S1 in the ticket order base table is performed, then the ticket order base table, the dialogue states S1, and the goal, ticket order, are pushed onto the stack 609. Following this, the actions of entering the time table query base table, matching the dialogue states in time table query base table, selecting response actions and executing the actions are performed.

The following illustrates the operation flow of the preferred embodiment of the dialogue manager of the invention performed with the railroad service in the public transportation service system.

According to the dialogue manager and the hierarchical task description table of the invention, the possible dialogue performed with the system is as follows ("S" stands for system, "U" for user, "Si" for initiate dialogue of the service).

Si : Welcome to the railroad service system. What kind of ticket do you want to order?

U1: I want to order a Tzu-Chiang train ticket from Taipei to Hsinchu, and the departure time will be tomorrow morning at 10:00 am.

S1: Sorry. There is no the train that you want. Four trains are available around 10:00 am. The closest one leaves Taipei at 9:55 am and arrives at Hsinchu at 10:57 am. Do you want to order this train?

U2: How much is it?

S2: The fare for a Tzu-Chiang train from Taipei to Hsinchu is NT$180. Do you want to order this train?

U3: Yes.

S3: You have ordered a Tzu-Chiang train ticket from Taipei to Hsinchu, and the train will leave Taipei at 9:55 am and arrive at Hsinchu at 10:57 am tomorrow. The series number for your reservation is 860667. Do you want to order another ticket?

Figure 7:
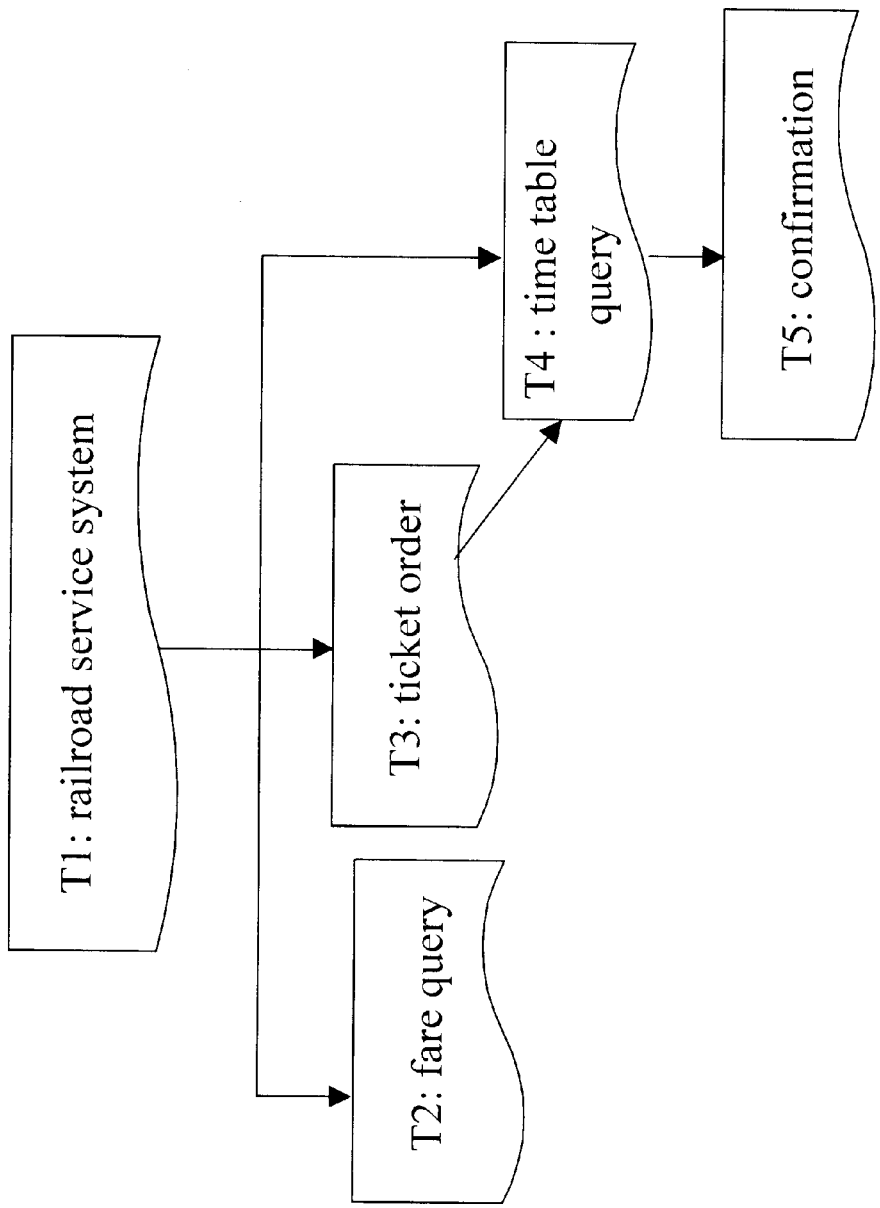
FIG. 7 shows the hierarchical task description table of the railroad service system illustrated in FIG. 3.

FIG. 7 illustrates the hierarchical task description table of the railroad service system which comprises five base tables, i.e. train service system base table T1, fare query base table T2, ticket order base table T3, time table query base table T4 and confirmation base table T5.

According to the above dialogue flow and the base tables T1~T5, the dialogue manager of the present invention will become more apparent by analyzing the dialogue with reference to the accompanying drawings 8(a)~10(b), and 11(a)~(e).

Dialogue Analysis 1

At the beginning, all the values of the system state are empty. Therefore, it corresponds to the state S4 in the base table T1 as shown in FIG. 11(a) and denoted as [T1:S4]. The response action for the state [T1:S4] is greeting.

Si: Welcome to the railroad service system. What kind of ticket do you want to order?

U1: I want to order a Tzu-Chiang train ticket from Taipei to Hsinchu, and the departure time will be tomorrow morning at 10:00 am.

Figure 8A:
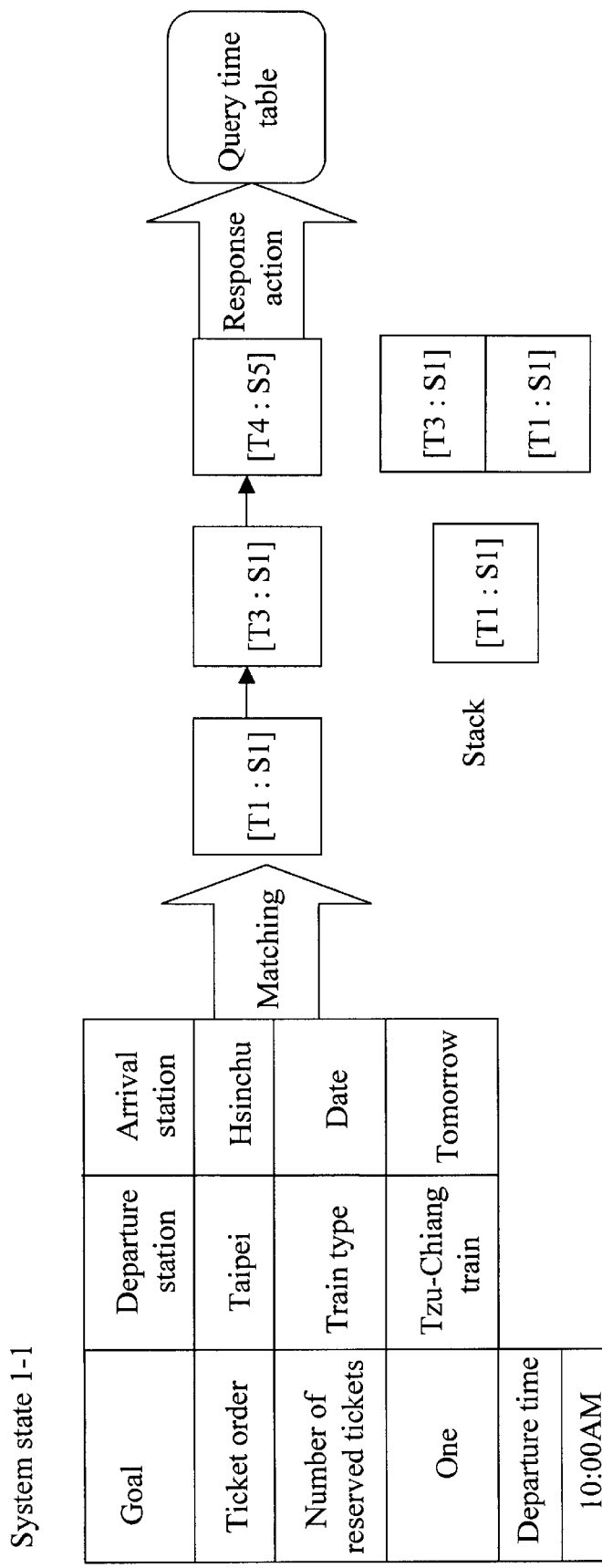
FIGS. 8(*a*)–10(*b*) shows the system state tables formed by analyzing the dialogue in the embodiment of the dialogue manager of the present invention.

According to the dialogue, the dialogue manager of the present invention updates the system state table as shown in FIG. 8(a). At the first matched state [T1:S1], the dialogue manager enters ticket order base table T3 as shown in FIG. 11(c) according to the response action of the matched state [T1:S1]. The current base table, the dialogue state [T1:S1], and the goal, ticket order, are also pushed onto the stack (as shown below the right-hand side of FIG. 8(a)). In the base table T3, state S1 is matched. The dialogue manager enters time table query base table T4 as shown in FIG. 11(d) and continues matching, and pushes the dialogue state [T3:S1] onto the stack. The dialogue manager finally matched the dialogue state [T4:S8] as shown in FIG. 11(d), and the response action of the dialogue state [T4:S8] is submitting a request to the database querying for data (querying for the time table).

Figure 8B:
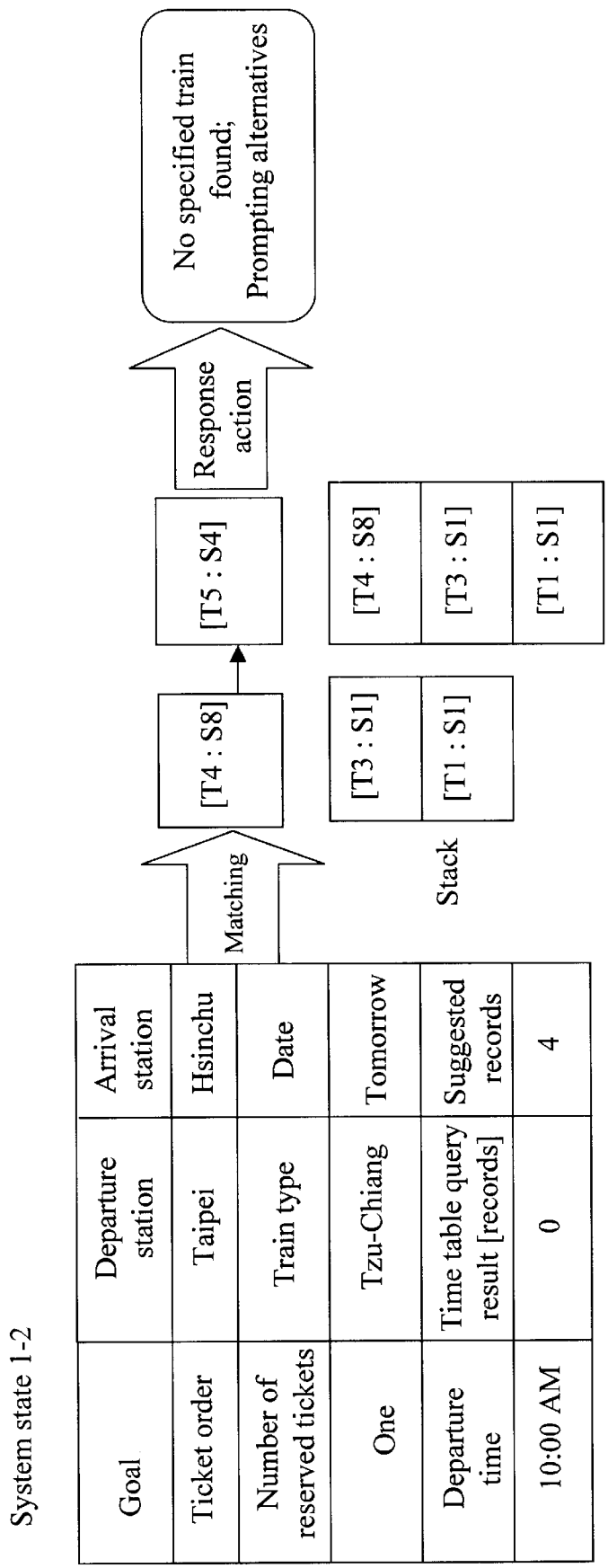

Having proceeded with the query, the database sends a message to the dialogue manager that no available record was found, but four alternatives around the requested time. Knowing the message from the database, the dialogue manager of the invention changes the system state as shown in FIG. 8(b), and matches the system state with the current base table T4. The dialogue manager finally matched the dialogue state [T5:S4] as shown in FIG. 11(e), and the response action of the dialogue state [T5:S4] is prompting the "No specified train found" message and the alternatives to ask the user for the confirmation.

Dialogue Analysis 2

S1: Sorry. There is no train that you want. Four trains are available around 10:00 am. The closest one leaves Taipei at 9:55 am and arrives at Hsinchu at 10:57 am. Do you want this train?

U2: How much is it?

Figure 9A:
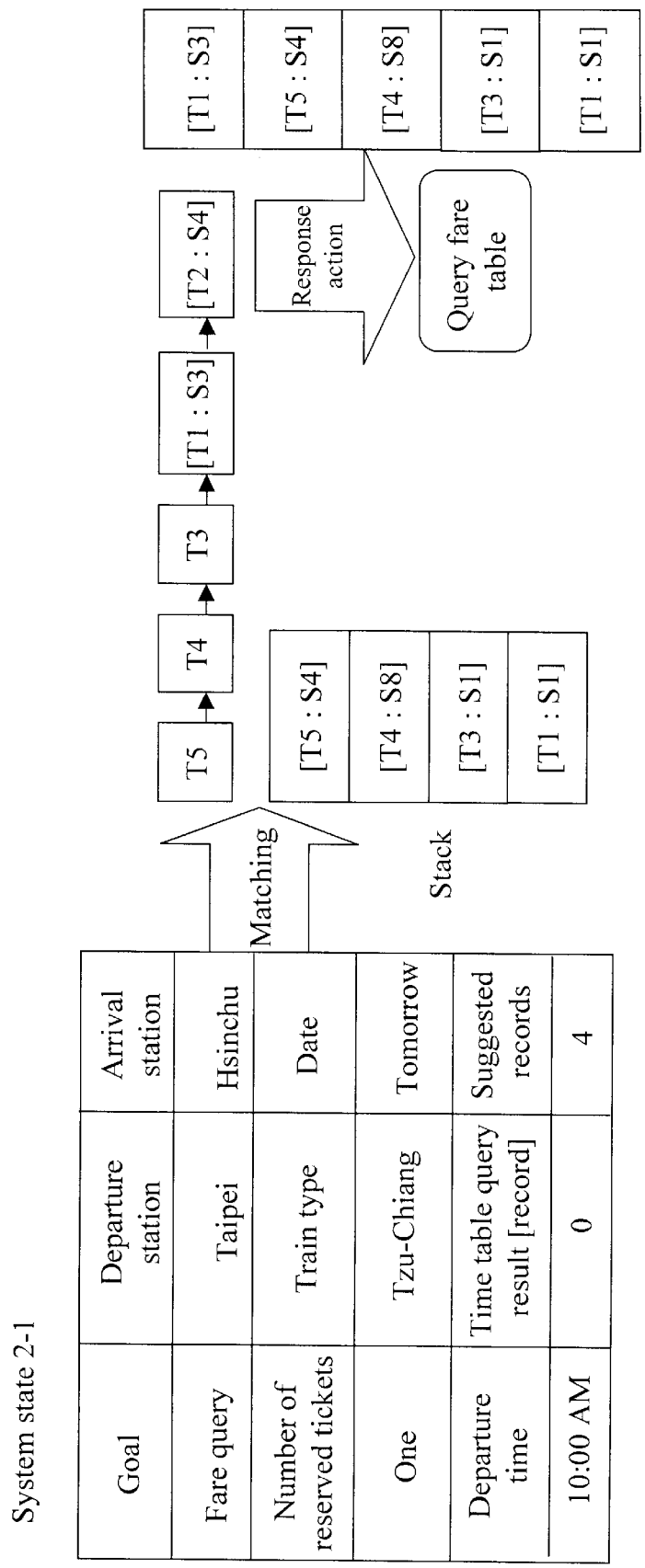

According to the dialogue, the dialogue manager of the present invention updates the system state table as shown in FIG. 9(a). Because the user input changes the goal field of the system state, the previous executed dialogue state [T5:S4] and the goal, ticket order, are pushed onto the stack. According to the base tables recorded in the stack, the base tables are matched one by one, until the base table has the goal parameter and its condition is exactly equal to "fare query". The matched dialogue state is [T1:S3]. According to the response action for the dialogue state [T1:S3], the dialogue manager enters fare query base table T2 as shown in FIG. 11(b) and continues matching. After having completed the matching process, the response action of the dialogue state [T2:S4] is submitting a request to the database querying for the fare.

Figure 9B:
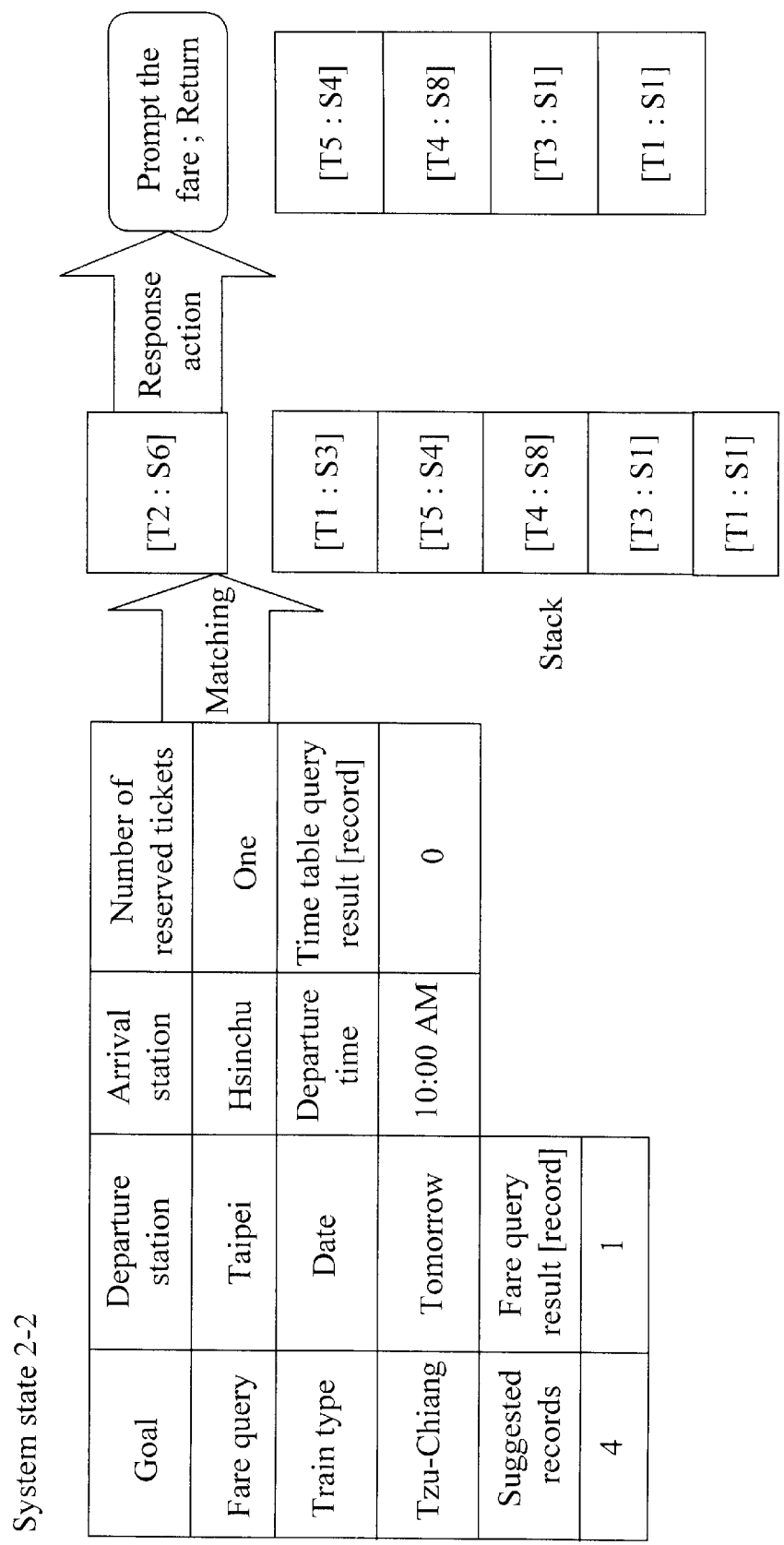

Having proceeded with the query, the database sends a message to the dialogue manager that one record was found. Knowing the message from the database, the dialogue manager of the invention changes the system state as shown in FIG. 9(b), and matches the system state with the current base table T2. Having matched with the dialogue state [T2:S6], the dialogue manager informs the user of the fare found, then pops up the top entry [T1:S3] on the stack, and comes back to the dialogue state [T1:S3] to continue performing the action interrupted by the table switching action.

Dialogue Analysis 3

S2-1: The fare for a Tzu-Chiang train from Taipei to Hsinchu is NT$180.

There are two response actions of the state [T1:S3] interrupted by the table switching action. One is to reset the goal to fill in the goal field of a system state with the top entry on the stack. The other is to return to the top entry on the stack from a current dialogue state and continue executing the top entry. This execution is just in response to part of the user's question.

S2-2: Do you want this train?

U3: Yes.

Figure 10A:
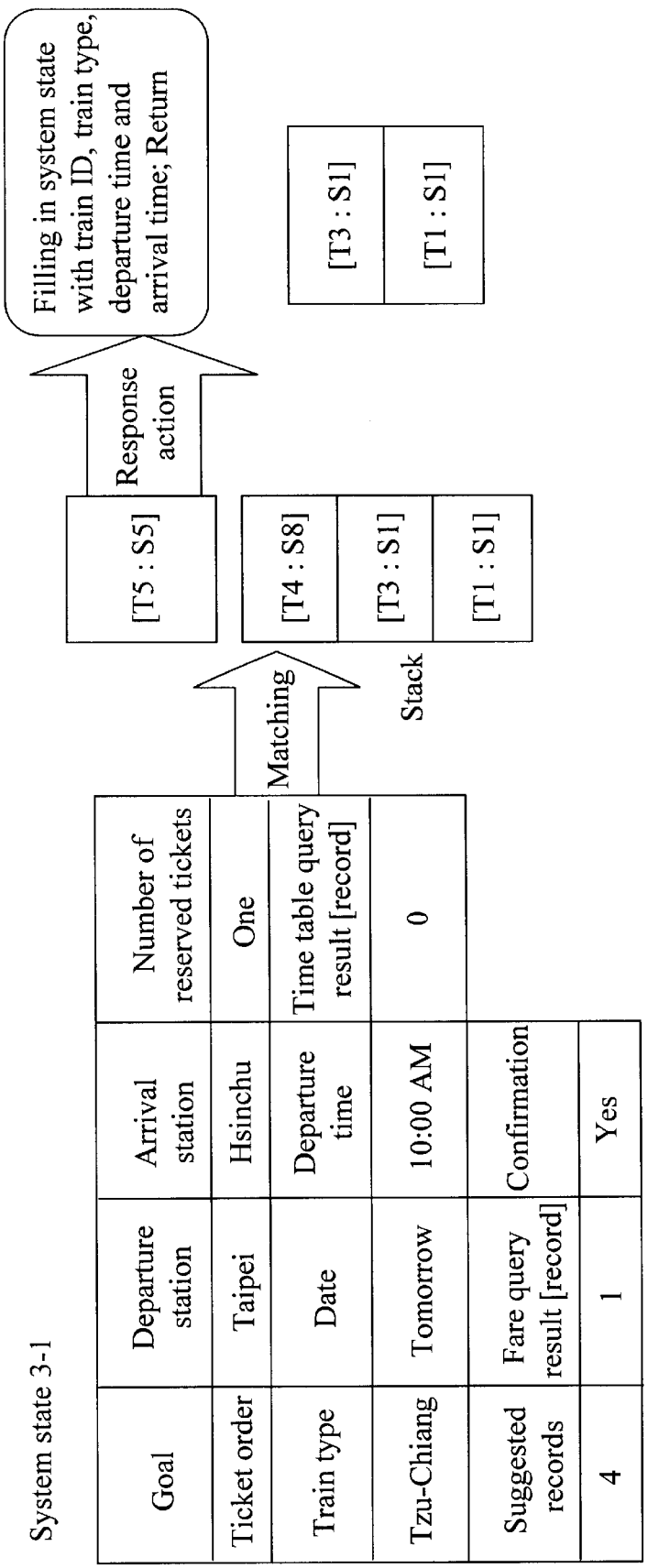
Figure 10B:
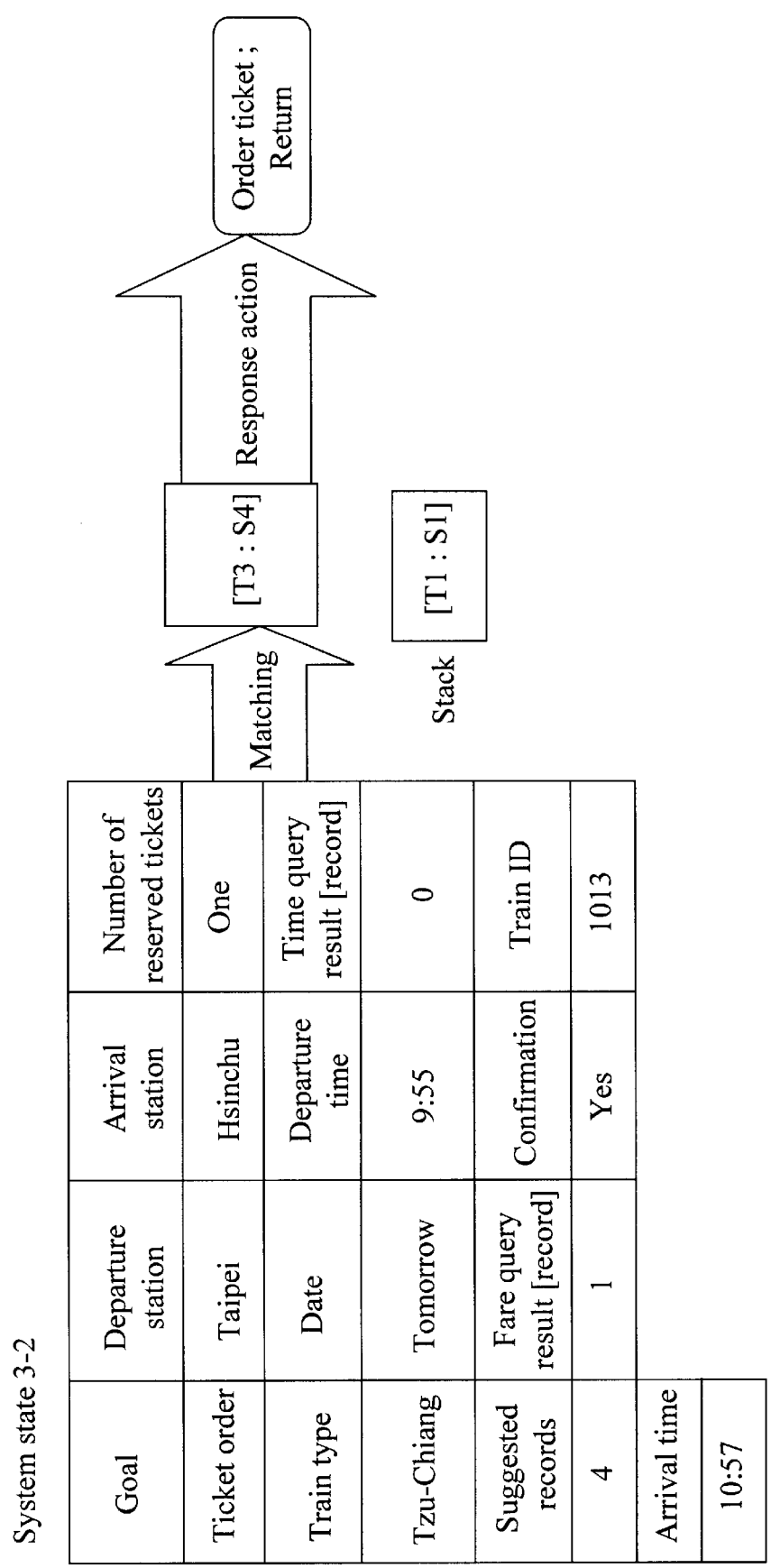

According to the dialogue, the dialogue manager of the present invention updates the system state table as shown in FIG. 10(a). The response actions for matching with the current base table T5 includes the following: (1) Filling in the system state with the train ID, the train type, the departure time and the arrival time for the ticket that the user makes sure to order. This is illustrated as the left hand side of the table of FIG. 10(b). (2) Popping up the top entry [T4:S8] on the stack. (3) Checking the return indicator of the confirmation base table. Because the state [T5:S5] has no return indicator, the dialogue manager executes the next response action of the state [T4:S8], i.e. returning to the previous base table and continuing matching.

The top entry [T3:S1] on the stack is popped out again. Because the state [T4:S8] returns an indicator of rematch, the dialogue manager rematches current system state with the base table T3. Finally, the matched dialogue state is [T3:S4] and one of its response actions is "order ticket". The action of "order ticket" includes ordering ticket and acknowledging the user the reserved ticket and the serial number for the ticket, . . . etc.

S3-1: You have ordered a Tzu-Chiang train ticket from Taipei to Hsinchu, and the train will leave Taipei at 9:55 am and arrive at Hsinchu at 10:57 am tomorrow. The series number for your reservation is 860667.

The other response action of [T3:S4] is returning to the top entry of the stack from current dialogue state. At the moment, the stack is empty. It means all the interaction about the train service required by the user is ended. Therefore, the dialogue manager of the present invention automatically clears the content of the system states, and provides a response message asking the user whether another service is needed, such as follows.

S3-2: Do you want to order another ticket?

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A portable dialogue management system comprising:
    a dialogue manager managing dialogue states of a dialogue system and selecting at least one appropriate dialogue state and executing a plurality of response actions according to said selected at least one appropriate dialogue state, said dialogue manager receiving semantic input and generating semantic output according to instructions provided by a domain-dependent external knowledge base; and
    a hierarchical task description table storing said dialogue states and defining dialogue strategy of said dialogue system for said external knowledge base, said hierarchical task description table including a plurality of base tables connected with a hierarchical structure and each base table defining the strategy of a sub-dialogue.

2. The portable dialogue management system as claimed in claim 1, wherein each base table comprises a number of parameters, a plurality of dialogue states, and a plurality of response actions corresponding to each state.

3. The portable dialogue management system as claimed in claim 2, said dialogue states being determined by the conditions of said parameters.

4. The portable dialogue management system as claimed in claim 2, wherein a dialogue state is further set up with attributes including a priority attribute or a group attribute.

5. The portable dialogue management system as claimed in claim 4, wherein a dialogue state further has a priority which includes an explicit priority defined by said priority attribute and an implicit priority determined by said dialogue manager.

6. The portable dialopue management system as claimed in claim 2, wherein a response action includes responding to a user, sending a request to other system sources, changing the content of a system, state, and entering another base table for determining a plurality of dialogue states.

7. A portable dialogue management system comprising:
    a dialogue manager managing dialogue states of a dialogue system and selecting at least one appropriate dialogue state and executing a plurality of response actions according to said selected at least one appropriate dialogue state, said dialogue manager receiving semantic input and generating semantic output according to instructions provided by a domain-dependent external knowledge base; and
    a hierarchical task description table storing said dialogue states and defining dialogue strategy of said dialogue system for said external knowledge base, said hierarchical task description table including a plurality of base tables connected with a hierarchical structure and each base table defining the strategy of a sub-dialogue;
    wherein said dialogue manager comprises:
        a system state update module for updating a system state of said dialogue system;
        a state matching module for determining a dialogue state by comparing the system state with the dialogue states stored in said hierarchical task description table;
        an action selection module for selecting a plurality of response actions according to the dialogue states determined by said state matching module; and
        an action execution module for executing a plurality of response actions selected by said action selection module.

8. The portable dialogue management system as claimed in claim 7, said dialogue manager further comprising a stack for pushing in or popping up a dialogue state to allow dialogues of more than one purpose.

9. The portable dialogue management system as claimed in claim 7, wherein each base table comprises a number of parameters, a plurality of dialogue states, and a plurality of response actions corresponding to each state.

10. The portable dialogue management system as claimed in claim 9, wherein a response action includes responding to a user, sending a request to other system sources, changing the content of a system state, and entering another base table and continuing matching.

11. The portable dialogue management system as claimed in claim 9, wherein a dialogue state is further set up with attributes including a priority attribute or a group attribute.

12. The portable dialogue management system as claimed in claim 11, wherein said action selection module selects said plurality of response actions according to said priority attribute or said group attribute.

13. A method of managing a portable dialogue system, comprising the steps of:
    preparing a domain-dependent external knowledge base using a hierarchical task description table for storing dialogue states and defining dialogue strategy of said dialogue system, said hierarchical task description table including a plurality of base tables connected with a hierarchical structure and each base table defining the strategy of a sub-dialogue;
    updating a system state of said dialogue system;
    determining a plurality of dialogue states by comparing the system state with the dialogue states stored in said hierarchical task description table;
    selecting a plurality of response actions according to the determined dialogue states; and
    executing the selected response actions;
    wherein updating the system state is accomplished according to semantic representation of user's input, other resources in said dialogue system, or response actions that change said system state.

14. The method of managing a portable dialogue system as claimed in claim 13, further comprising a step for pushing in or popping up a dialogue state to allow dialogues of more than one purpose.

15. The method of managing a portable dialogue system as claimed in claim 13, wherein said hierachical task description table comprises a plurality of base tables, each base table comprising a number of parameters, a plurality of dialogue states, and a plurality of response actions corresponding to each state.

16. The method of managing a portable dialogue system as claimed in claim 15, wherein a response action includes responding to a user, sending a request to other system sources, changing the content of a system state, and entering another base table for determining a plurality of dialogue state.

17. The method of managing a portable dialogue system as claimed in claim 15, wherein a dialogue state is further set up with attributes including a priority attribute or a group attribute.

18. The method of managing a portable dialogue system as claimed in claim 15, wherein said plurality of response actions are selected further according to said priority attribute or group attribute.

* * * * *